J. M. E. FRANC.
DISK WHEEL FOR MOTOR CARS.
APPLICATION FILED FEB. 15, 1918.
1,345,759. Patented July 6, 1920.
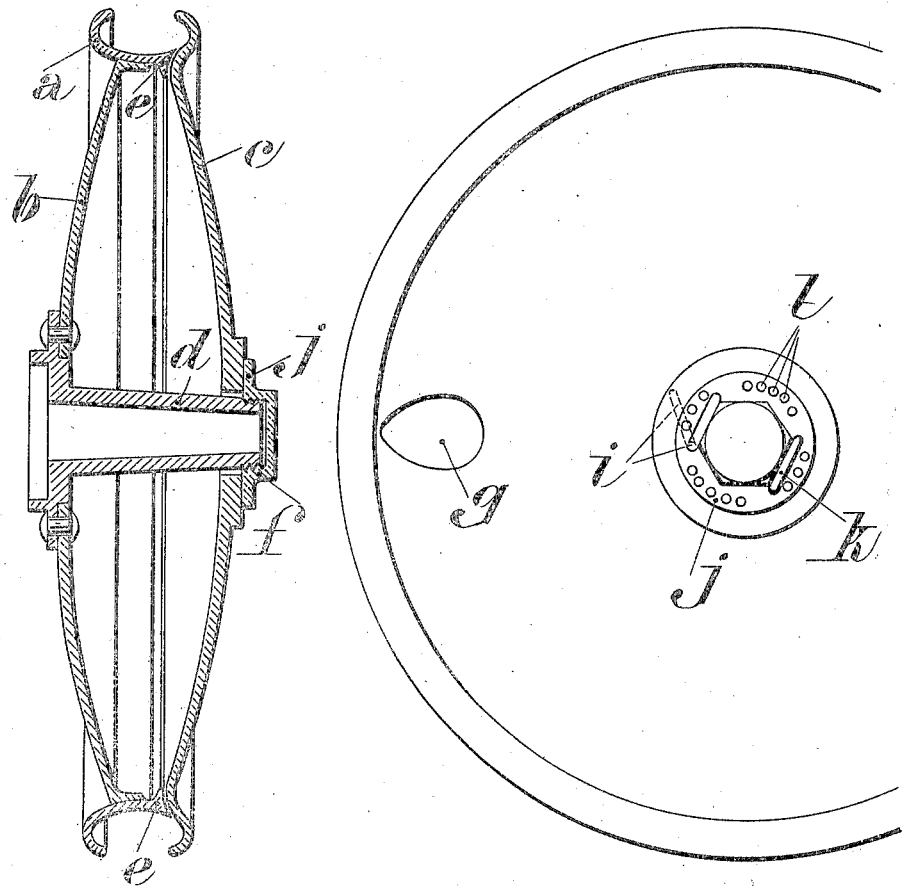
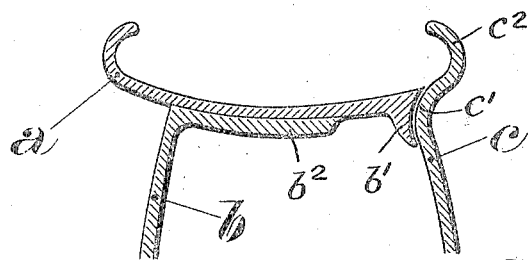

UNITED STATES PATENT OFFICE.

JOSEPH MARIE ETIENNE FRANC, OF ST. VALLIER, FRANCE.

DISK WHEEL FOR MOTOR-CARS.

1,345,759.  Specification of Letters Patent.  Patented July 6, 1920.

Application filed February 15, 1918. Serial No. 217,417.

*To all whom it may concern:*

Be it known that I, JOSEPH MARIE ETIENNE FRANC, a citizen of the French Republic, residing at St. Vallier, Drome, in France, have invented certain new and useful Improvements in Disk Wheels for Motor-Cars, of which the following is a specification.

This invention relates to improvements in disk wheels for motor cars.

The improved wheel is made of metal and has a divided rim and is essentially characterized by its rapid method of mounting and dismounting by the simple affixing or removal of a steel disk or plate maintained locked by a safety nut against a part of the rim designed to receive it.

The characteristic feature of the invention consists in the shape of the felly carried by the fixed disk and comprising on one side an incurved fold of metal for inclosing one of the beads of the pneumatic tire and extending in a concave form under the base of the tire and terminating in a thickened part against which the removable disk abuts, the latter having an incurved edge to receive the other bead of the tire. The result is that in the wheel forming the subject of the invention there is no fitting of one felly in the other, nor any helving of head, nor any bolt, nut, grub screw or the like at the periphery of the disks; in a word, no member capable of presenting an obstacle, by its oxidation or any other cause, to the removal of the movable disk.

By the shape given to the fixed disk which by curving inward concavely under the base of the tire, supports the whole weight of the carriage, the movable disk only intervenes to maintain the outer bead of the pneumatic tire in place. This shape prevents the felly from overhanging, and at the same time reduces the width of the wheel.

The surface of the adhesion of the movable disk against the thickened edge being considerable, and the greater part of the base and beads of the pneumatic tire being in immediate contact with the felly integral with the fixed disk (the movable disk only embraces a small part of the bead), it follows that there can be no sliding of the movable disk, and that all the contrivances against such sliding are omitted in the wheel which forms the subject of the invention.

The invention further comprises a locking device consisting of a central nut, a device which does not exist, in this form, in wheels of this class as hitherto made.

The annexed drawings illustrate the invention.

Figure 1 is a vertical section of the wheel.
Fig. 2 is a side elevation and
Fig. 3 is a section on an enlarged scale of the rim of the wheel.

The wheel is essentially composed of a rim portion $a$ riveted to a concave flange $b^2$ of a circular dished disk $b$ fixed to the hub $d$ carrying the brake drum, either by rivets or by direct casting.

Symmetrically externally with this disk is a second and removable disk $c$ forming the other face of the wheel and having centrally a circular opening to allow of passing it on to the hub $d$ on which it fits. The periphery of this second disk is incurved to form the removable rim portion $c^2$ as shown in Fig. 3 and is inwardly bent adjacent said rim portion to form a circular projection $c^1$ adapted to fit in and against an annular grooved thickened shoulder $b^1$ of the first rim portion $b$.

The affixing of the second disk forms the complete wheel and rim, the latter inclosing the beads of the pneumatic tire. A safety nut $f$ presses the second disk against the first and secures the whole. The rim in two parts thus forms a whole having the appearance and advantages of an ordinary rim inclosing the beads of the pneumatic tire in the usual manner.

In order to support the running pressure of the wheel the disk $b$ is bent to form a flange $b^2$ extending under its rim portion $a$ which is fixed thereto. Also to reduce the pressure of the beads of the tire on the tire retaining portion of the movable disk the bottom of the rim is slightly concave.

The disks being solid a covered opening $g$ is provided in the removable disk for affording access to the tire valve.

To assure the fixity of the device the locking nut $f$ is provided with a bronze flange $j$ extending beyond the hexagonal nut head. This flange is provided with a number of holes $l$ which correspond with an equal number of holes formed in the removable disk. A spring plate $i$ is arranged turnable on a pin and carrying at its end a button of sufficient length to pass through the flange and engage into one of the holes in the disk and thus assures locking of the nut. To assure greater security a second similar spring plate can be arranged opposite the first.

What I claim as my invention and desire to secure by Letters Patent of the United States is:—

A disk wheel comprising a hub, a dished circular disk having an inwardly turned concave flange fixed centrally on one end of said hub, a circular rim portion having a concave base fixed around said flange and having its one edge curved inwardly and its other edge thickened to form an annular grooved seating, a removable dished circular disk provided with a central orifice adapted to fit on said hub and having its periphery inwardly curved and being inwardly bent adjacent said inwardly curved periphery so as to form a circular inward projection adapted to coincide with and lie in said grooved seating, and a central nut for fixing said removable disk upon said hub.

In witness whereof I have signed this specification in the presence of two witnesses.

JOSEPH MARIE ETIENNE FRANC.

Witnesses:
JEAN GERMAIN,
L. ESCHER.